United States Patent [19]

Harold

[11] Patent Number: 5,337,509

[45] Date of Patent: * Aug. 16, 1994

[54] NO-SWALLOW DEVICE FOR FISH HOOKS AND THE LIKE

[76] Inventor: Billy E. Harold, 4960 Fletcher, Wayne, Mich. 48184

[*] Notice: The portion of the term of this patent subsequent to Apr. 12, 2011 has been disclaimed.

[21] Appl. No.: 968,616

[22] Filed: Oct. 29, 1992

Related U.S. Application Data

[63] Continuation-in-part of Ser. No. 864,403, Apr. 6, 1992, Pat. No. 5,301,453.

[51] Int. Cl.⁵ .............................................. A01K 85/00
[52] U.S. Cl. .................................. 43/42.74; 43/43.15; 43/43.16
[58] Field of Search .................... 43/43.2, 43.16, 43.15, 43/42.74, 43.1

[56] References Cited

U.S. PATENT DOCUMENTS

| | | | |
|---|---|---|---|
| 699,397 | 5/1902 | Lacey | 43/43.16 |
| 2,128,315 | 8/1938 | Parker | 43/43.2 |
| 2,790,265 | 4/1957 | Flynn | 43/43.15 |
| 3,101,565 | 8/1963 | Hoder | 43/43.16 |
| 3,118,245 | 1/1964 | Shriver | 43/43.15 |
| 5,065,542 | 11/1991 | Lindaberry | 43/42.74 |

Primary Examiner—Kurt C. Rowan
Attorney, Agent, or Firm—Krass & Young

[57] ABSTRACT

A modular harness device for supporting fish hooks and the like from a fishing line such that fish are prevented from swallowing the hook more than mouth deep. The device includes a vertical support shank suspended from the fishing line, at least one tubular lateral support connected to and extending laterally from the shank, and fish hook attachment structure for attaching a fish hook spaced a fixed distance from the vertical support. In one embodiment, there are two spaced coaxial lateral tubular supports with a removable guard wire or connector bar bridges the space between the supports upon insertion through the tubular lateral supports. In a further embodiment, the invention includes one or more rigid extension members removably connected to the harness for supporting a plurality of fish hooks or lures a fixed distance from the vertical support, the extension members engaging the connector bar to provide a built-in swing limit function. Removal of the connector bar permits removal of the extension members. Various inventive hook and lure attachment structure for the lateral supports and extension members is also shown.

30 Claims, 15 Drawing Sheets

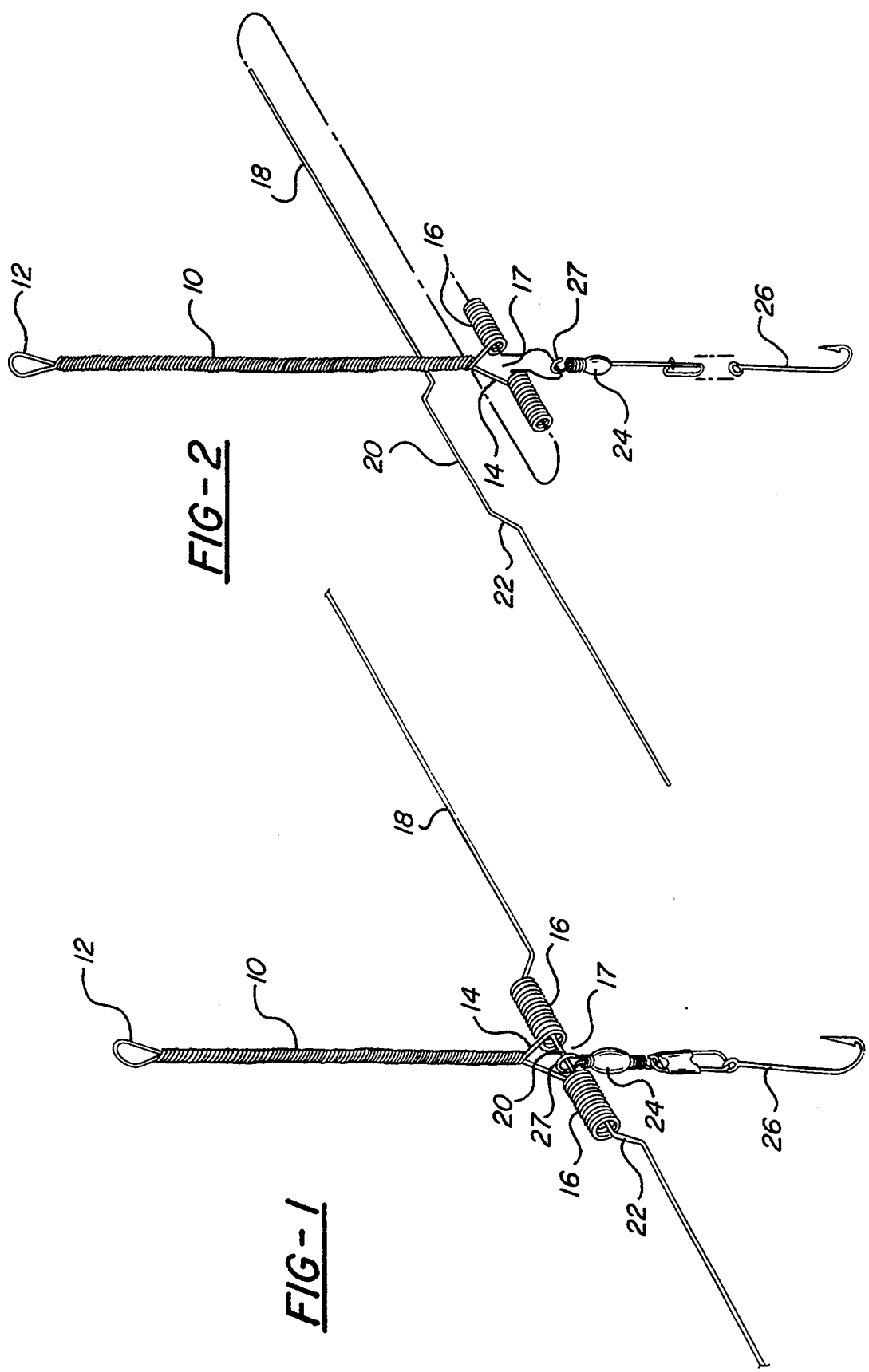

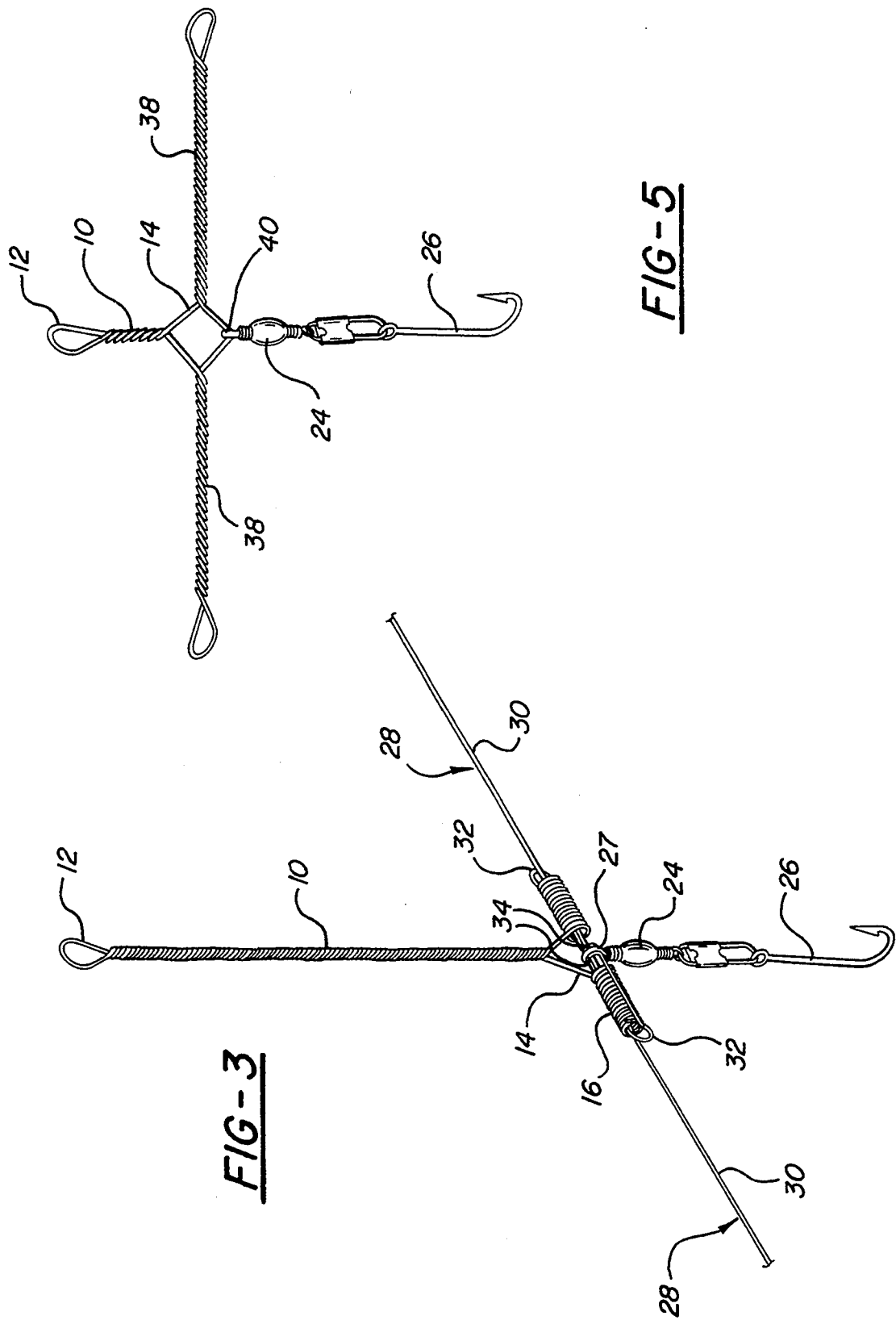

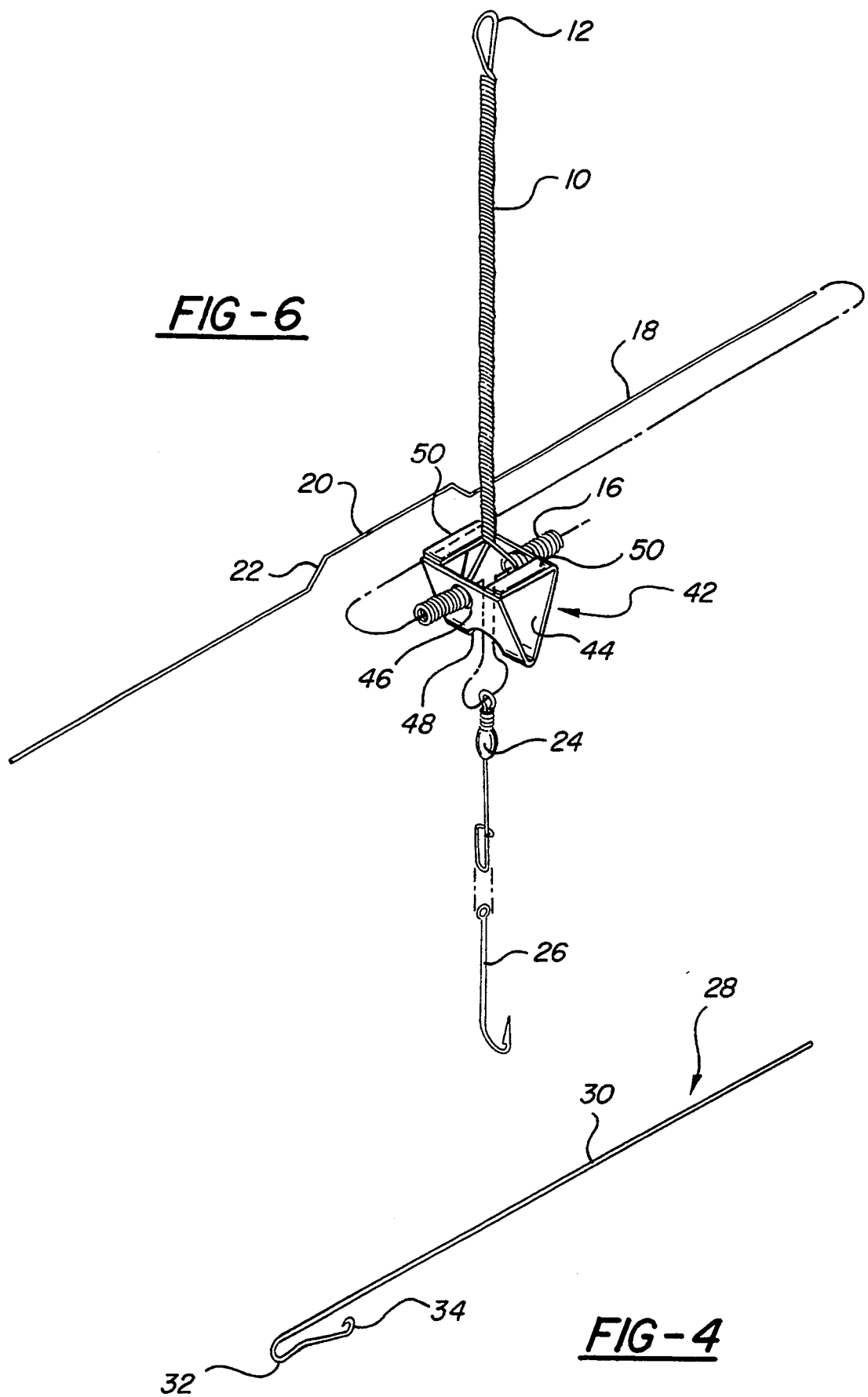

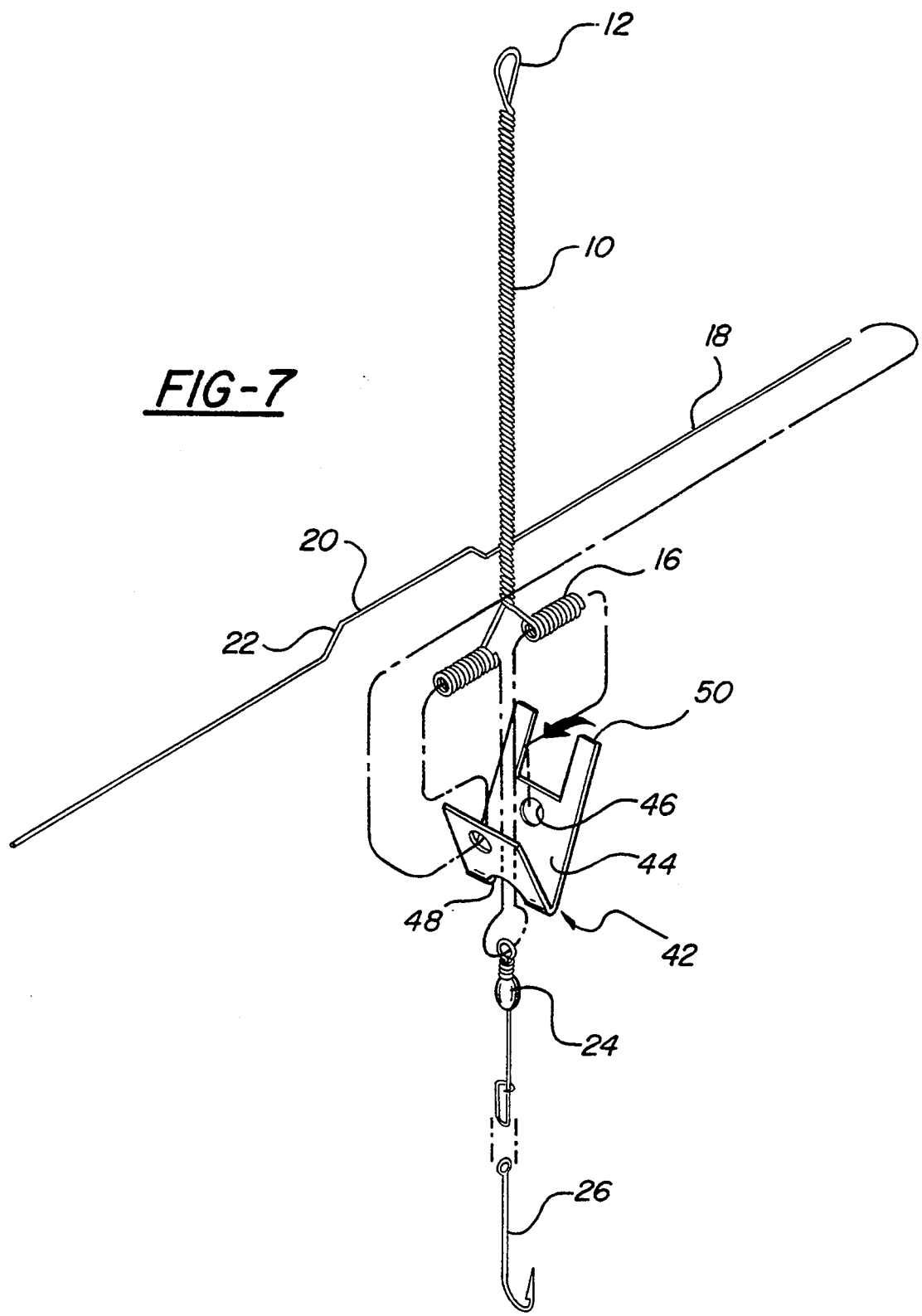

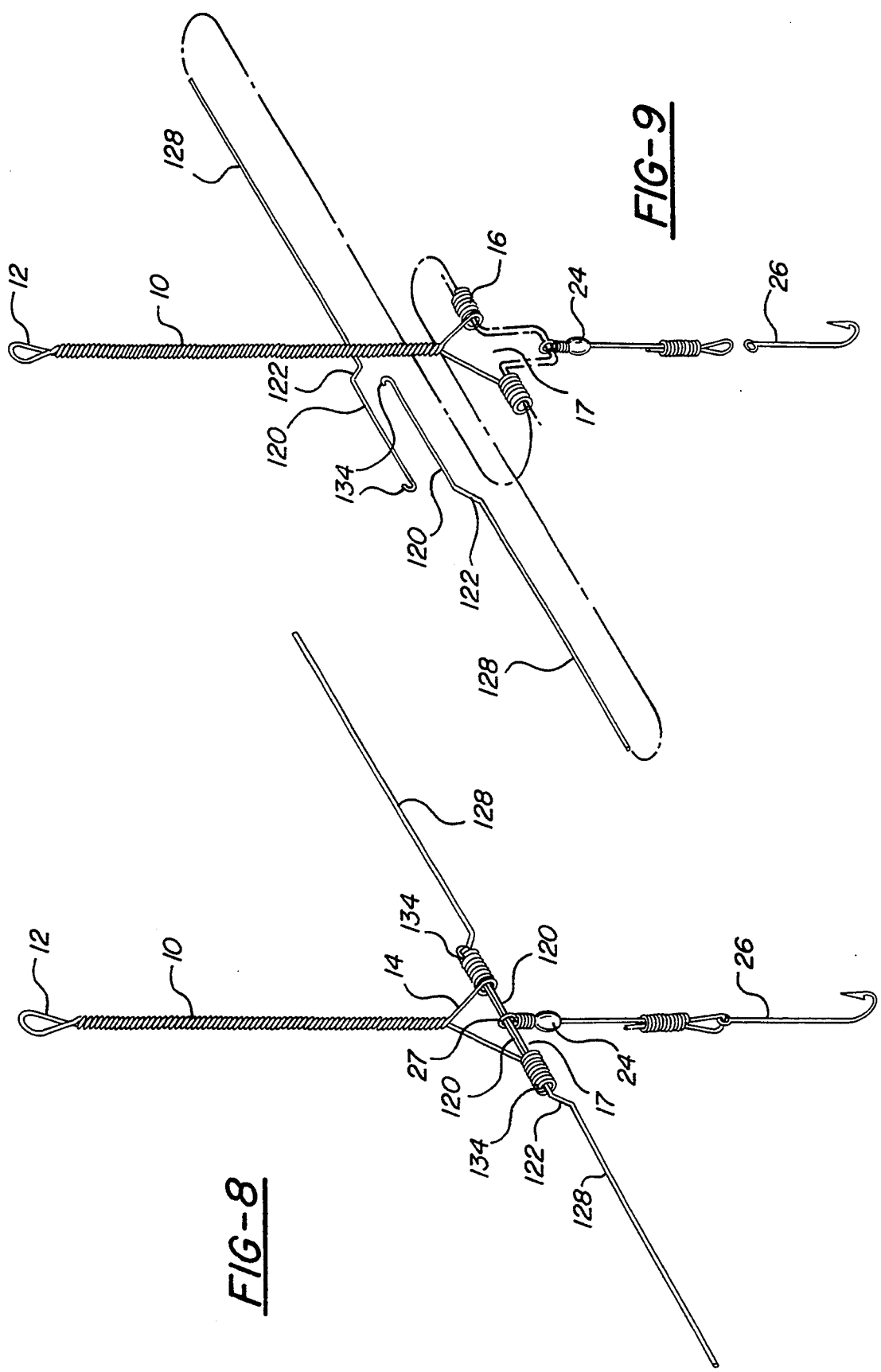

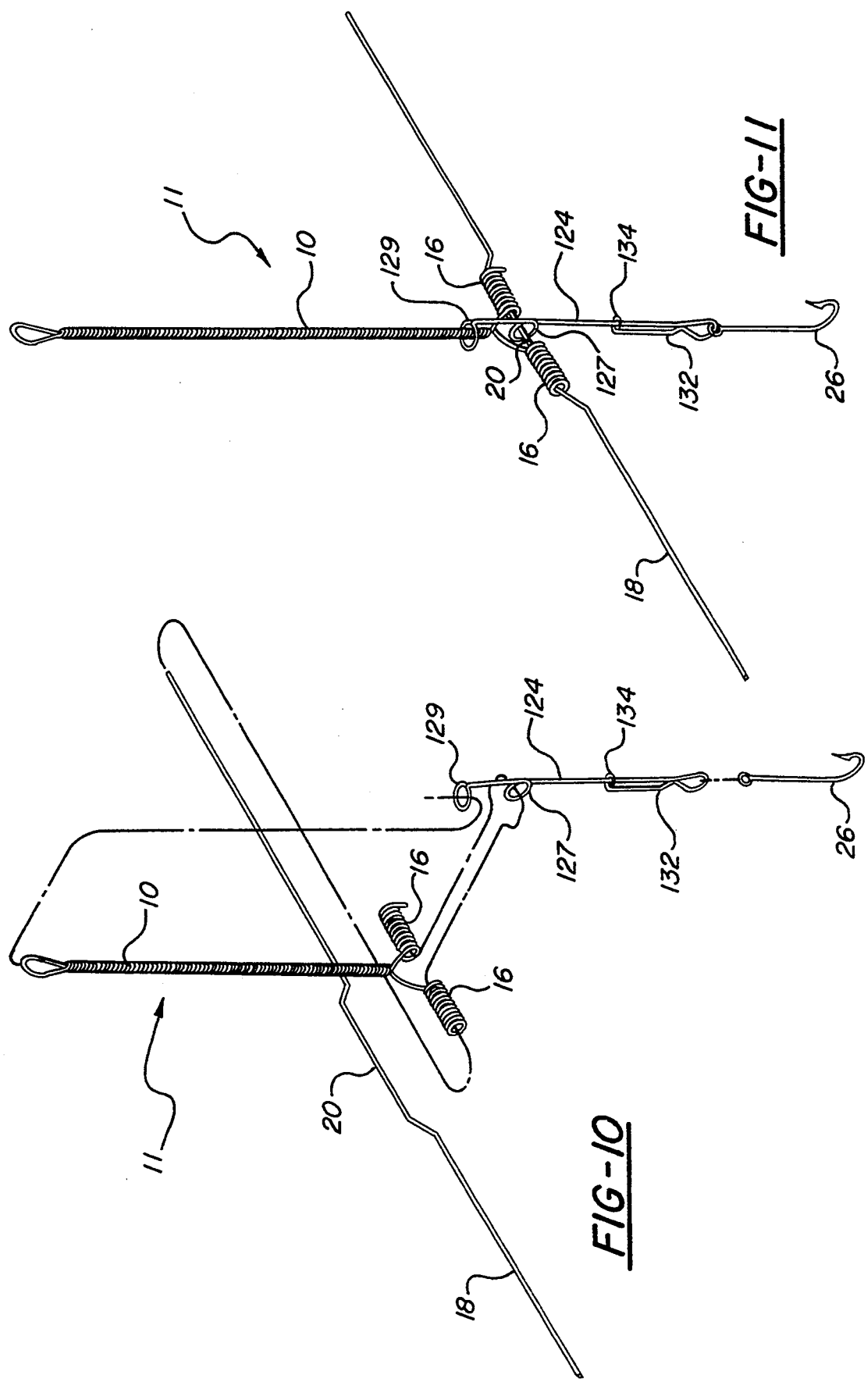

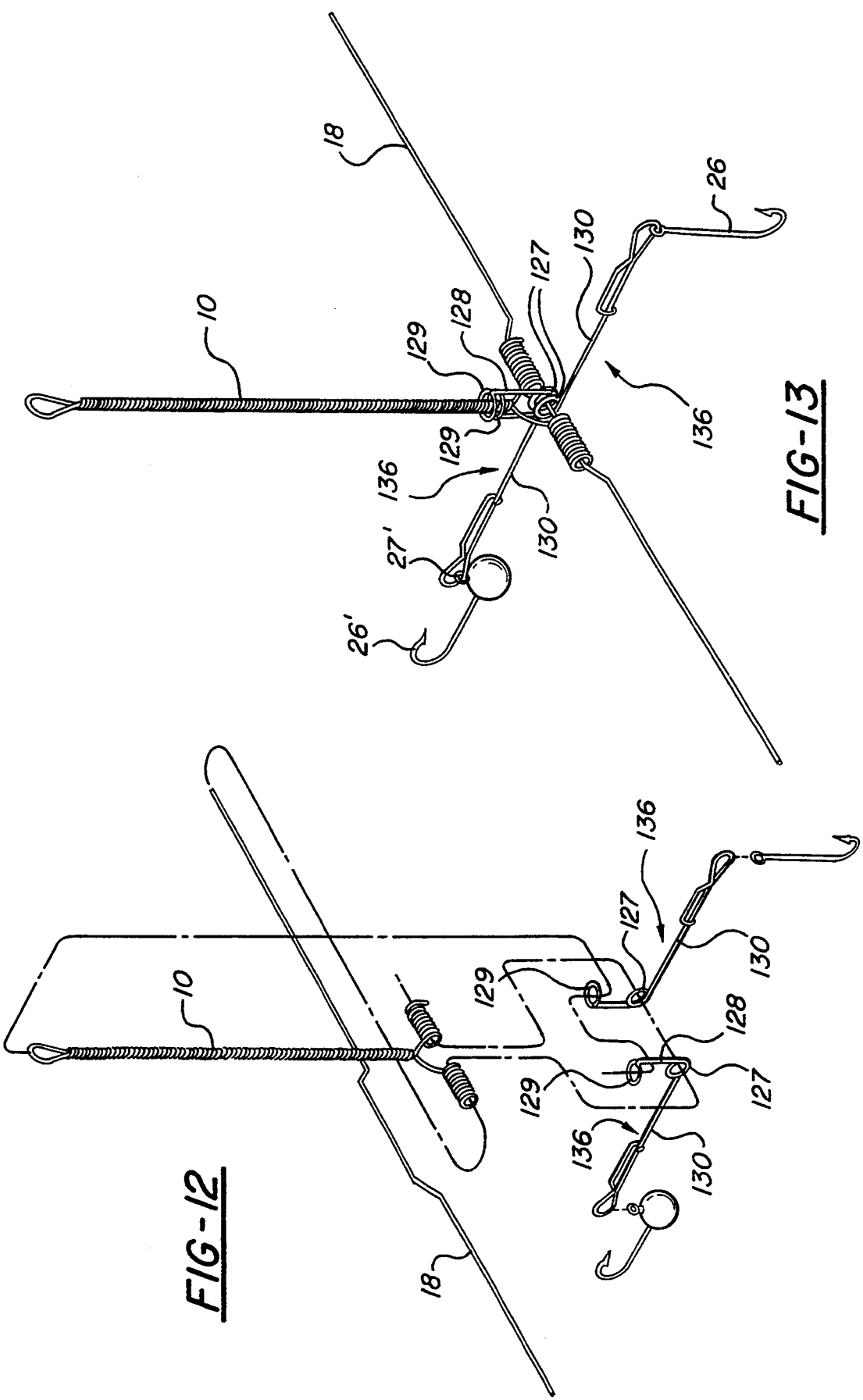

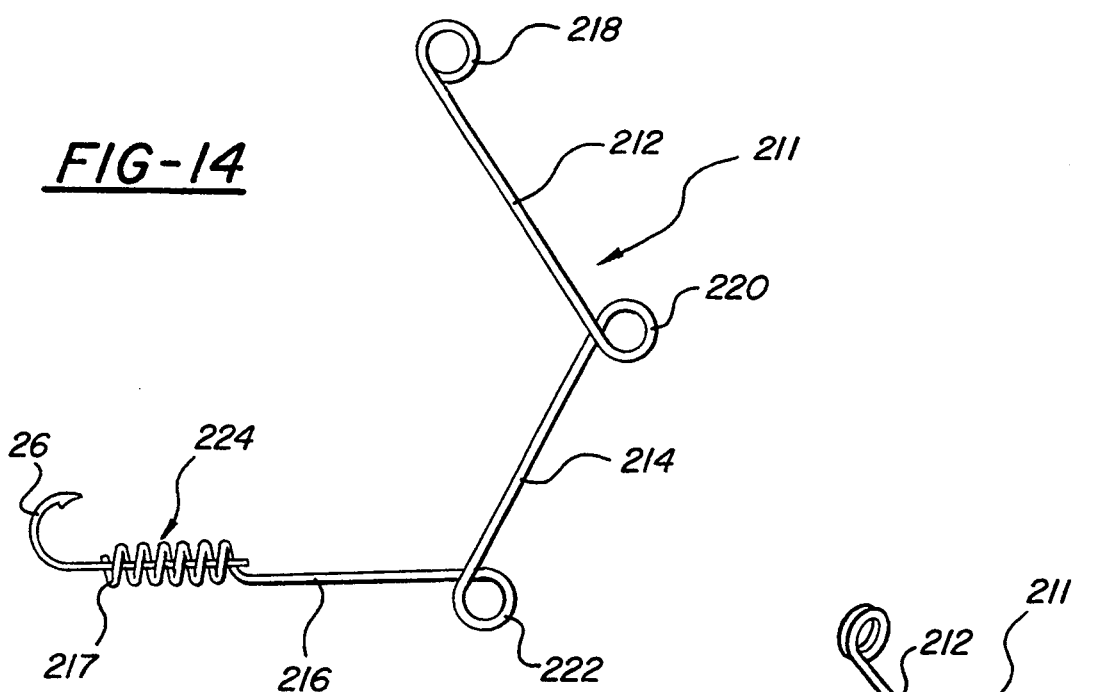
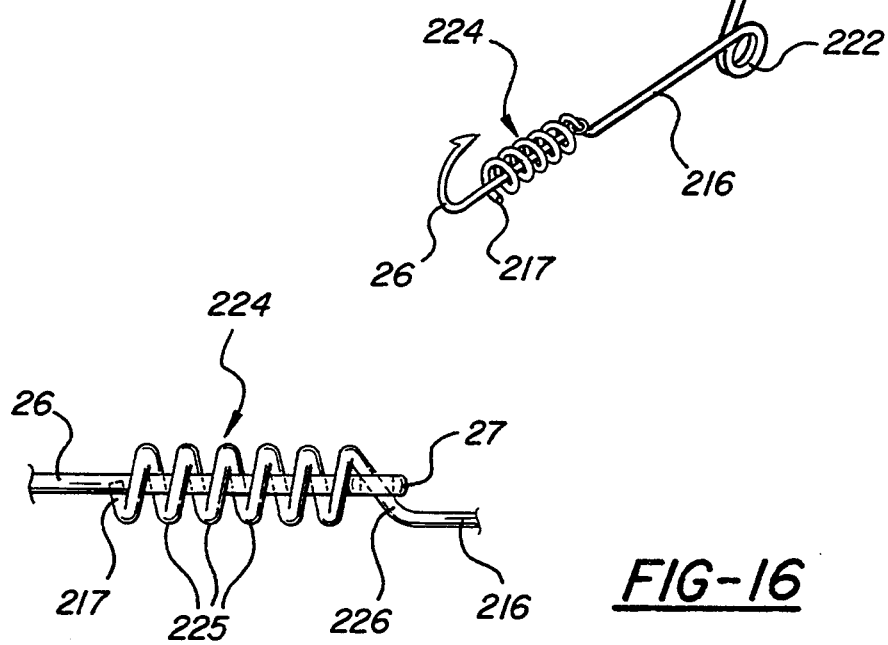

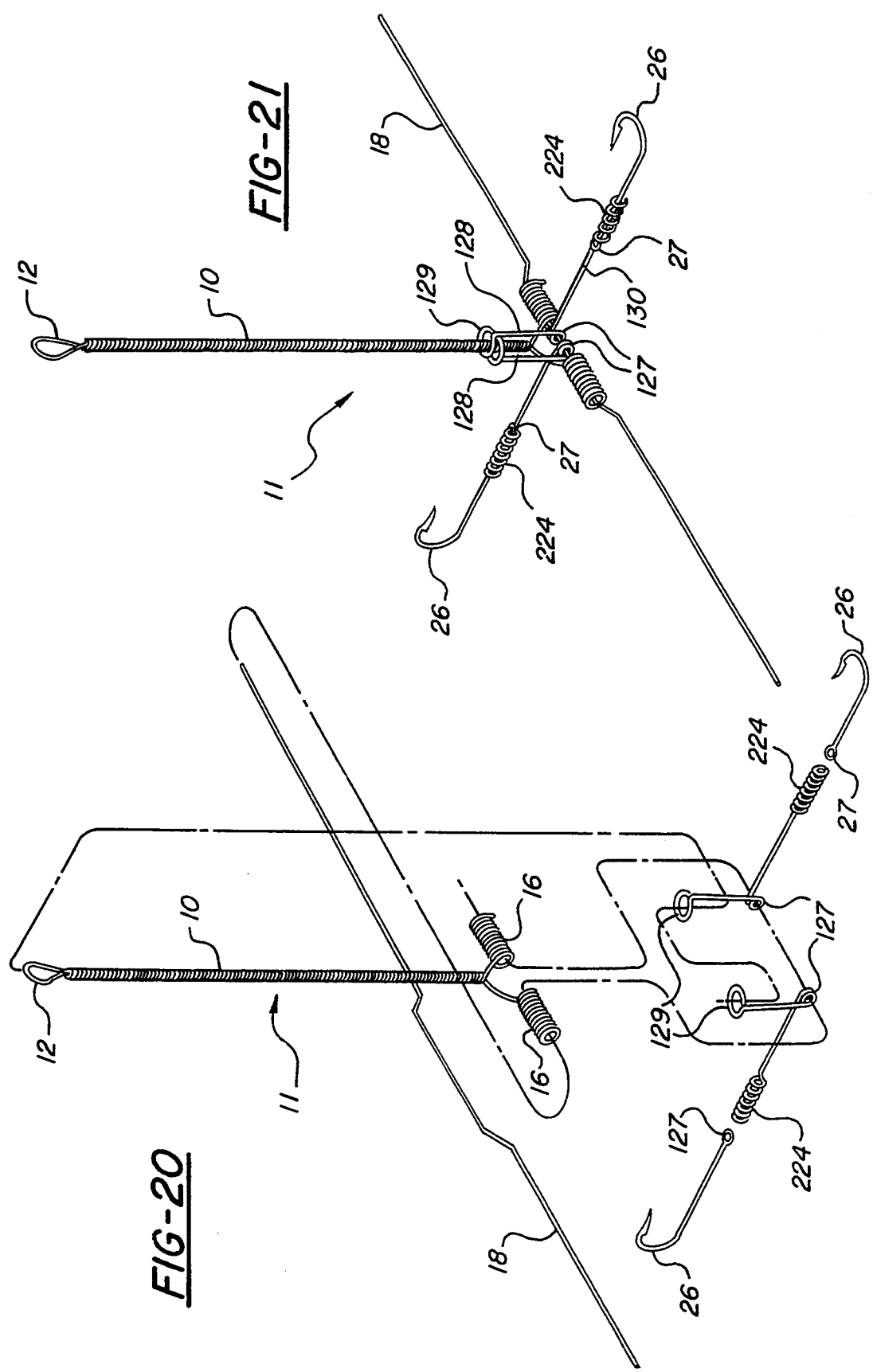

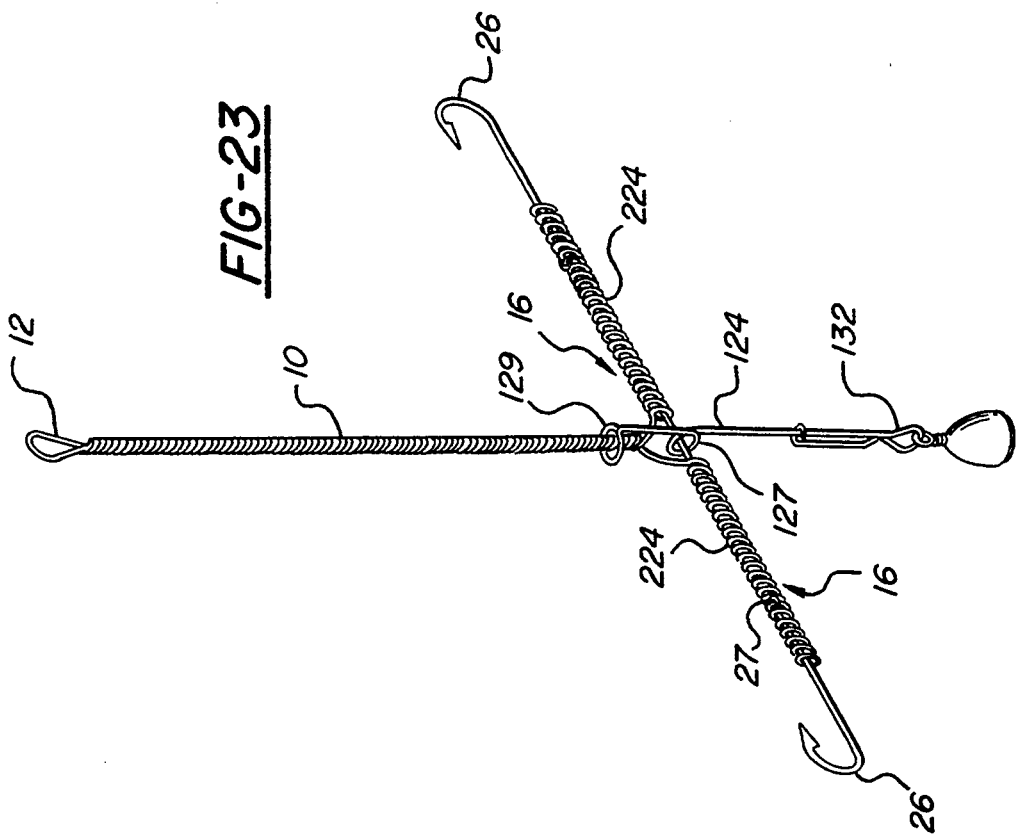
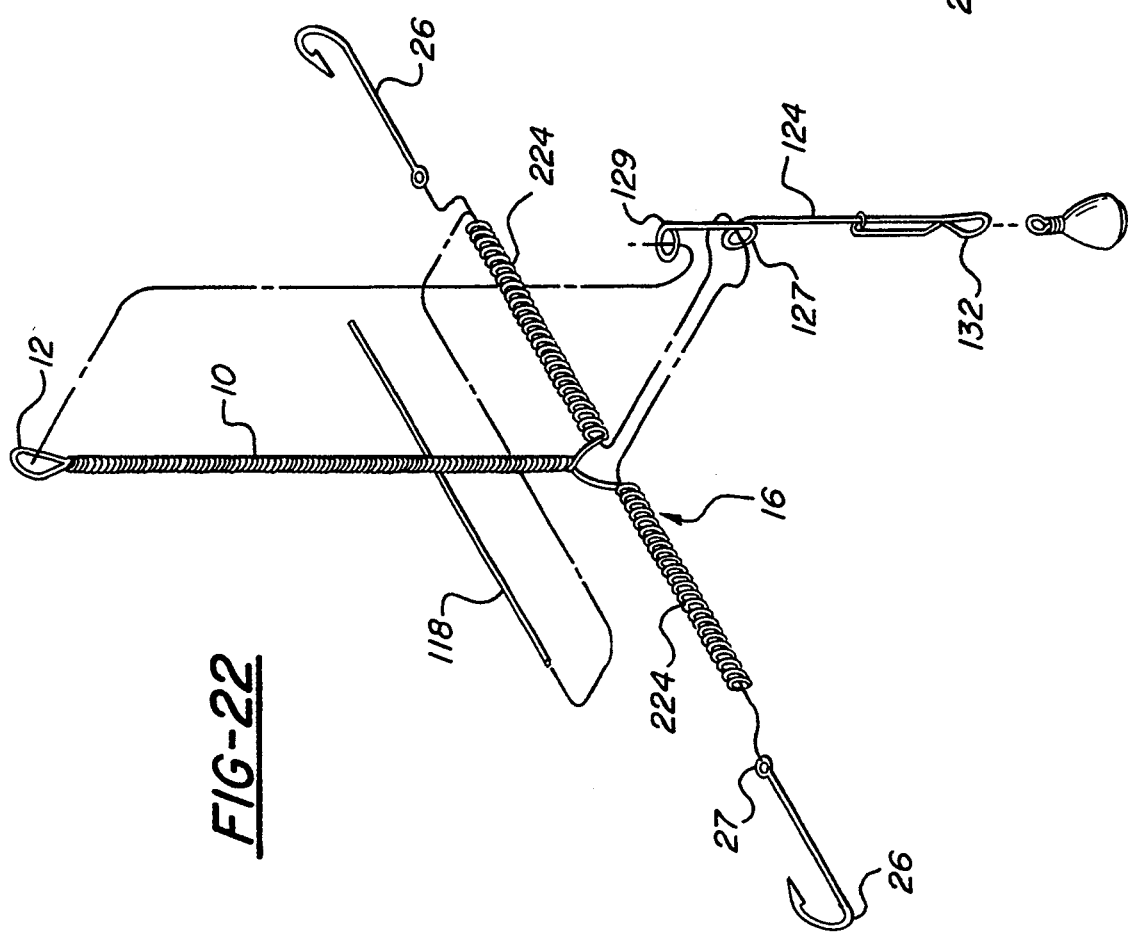

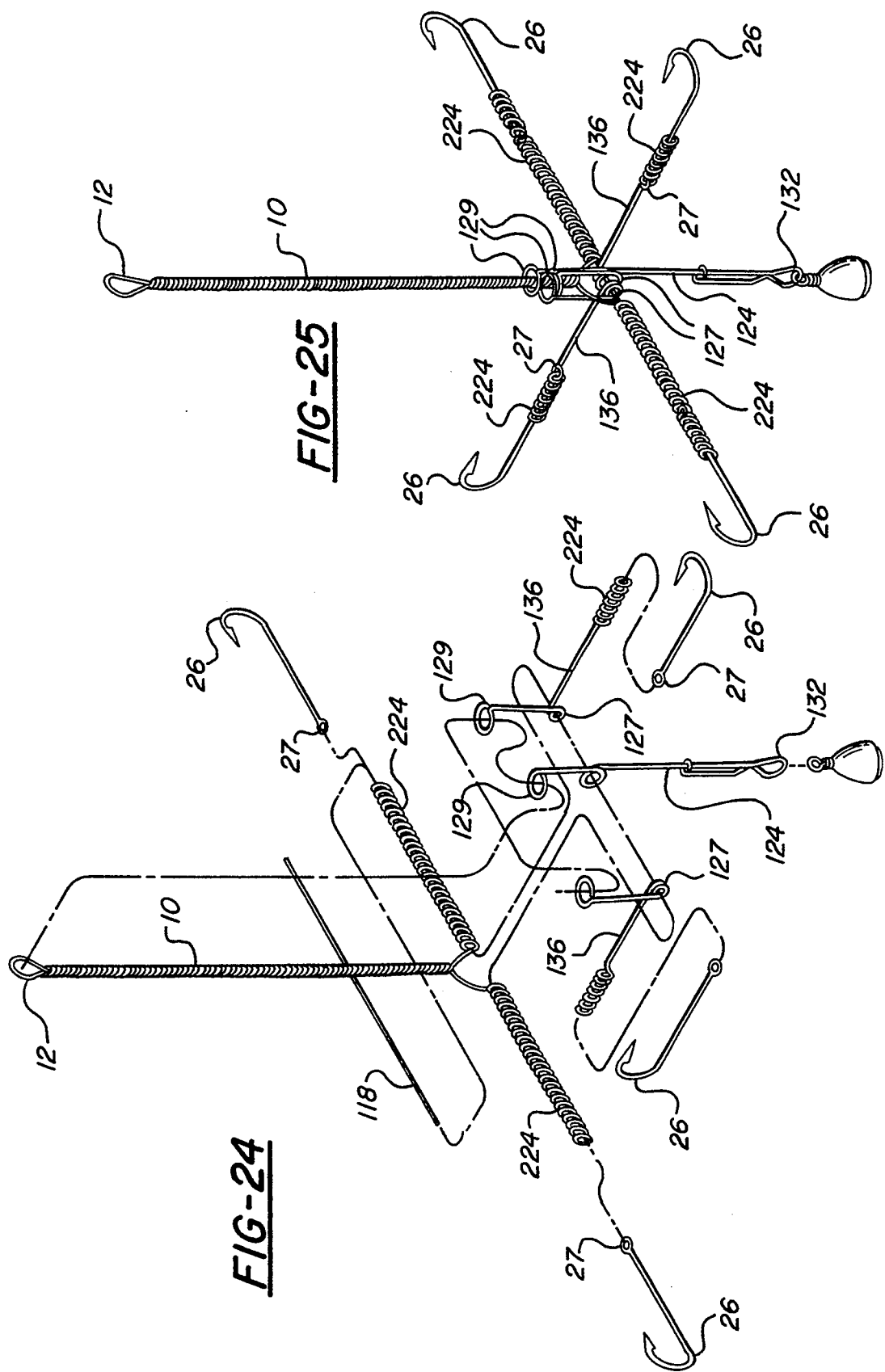

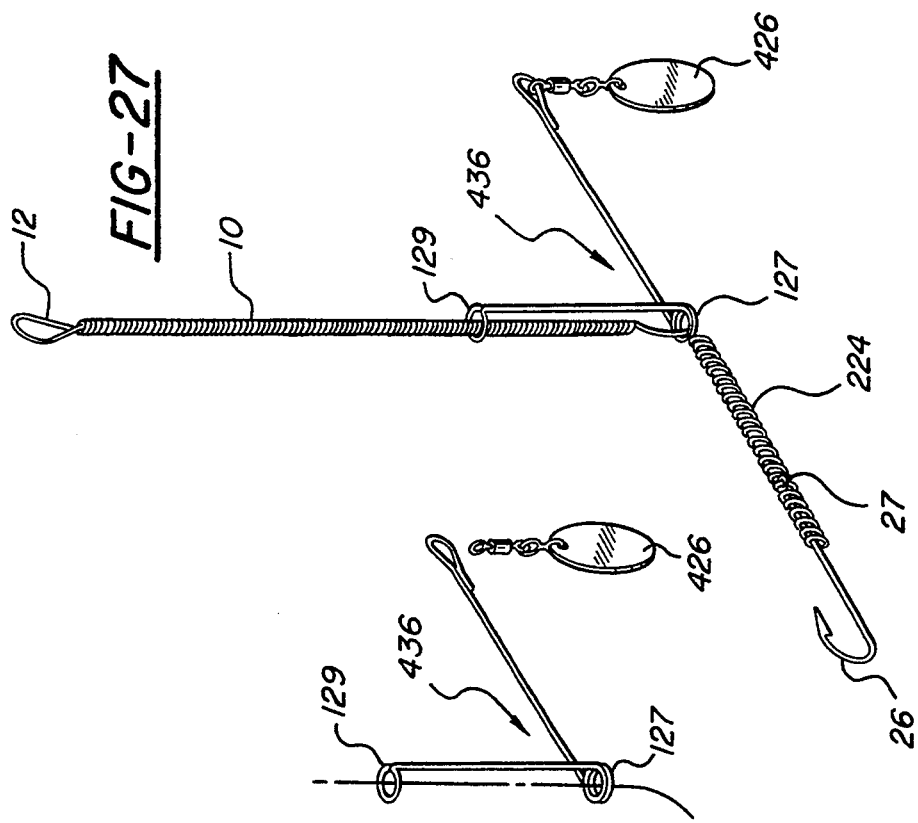
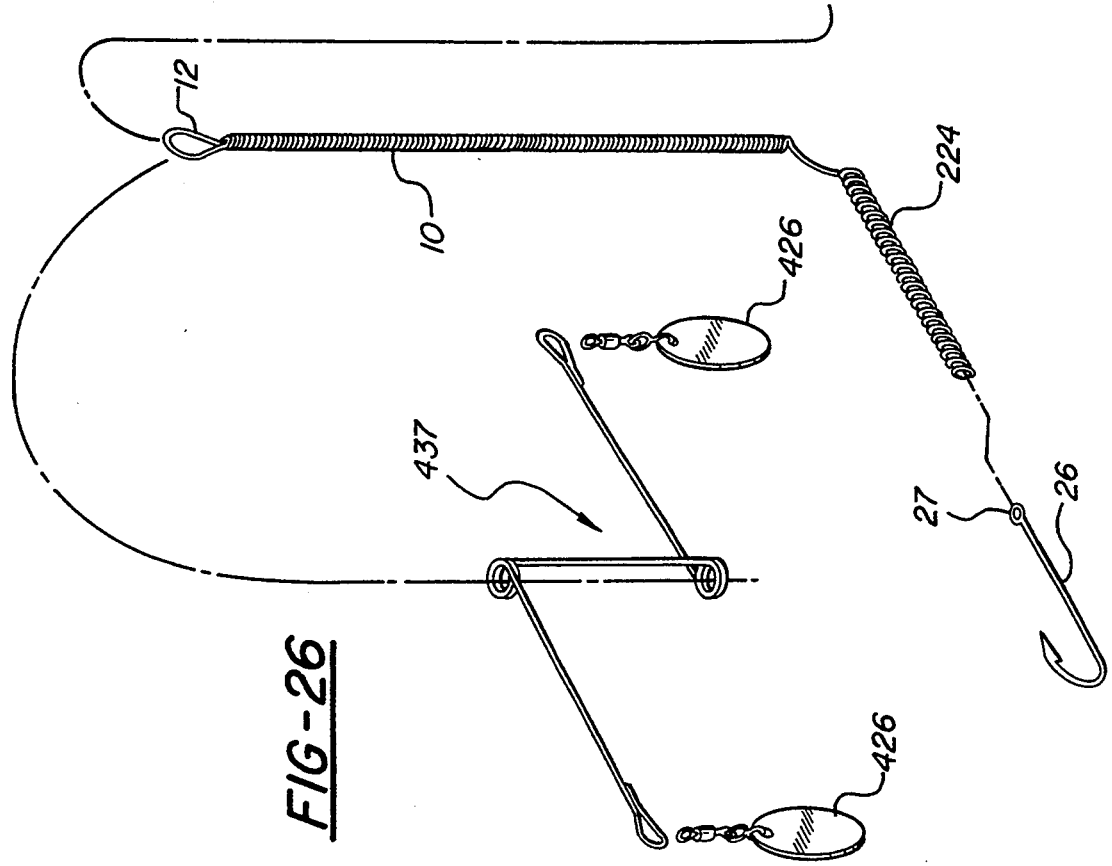

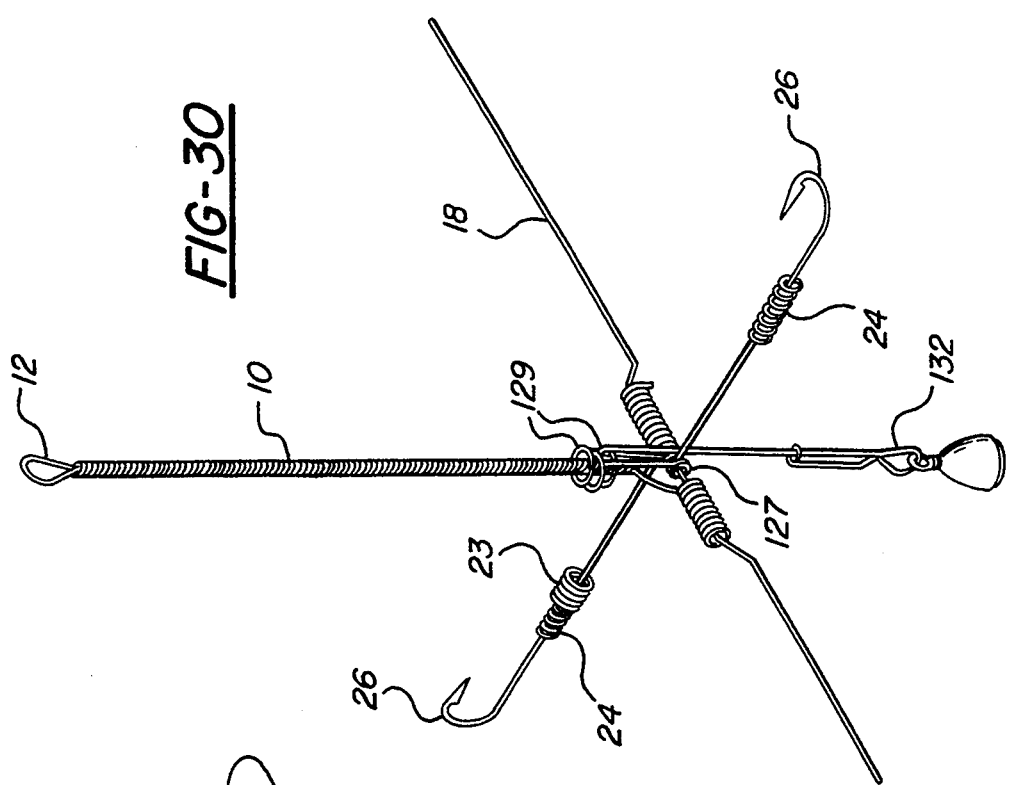
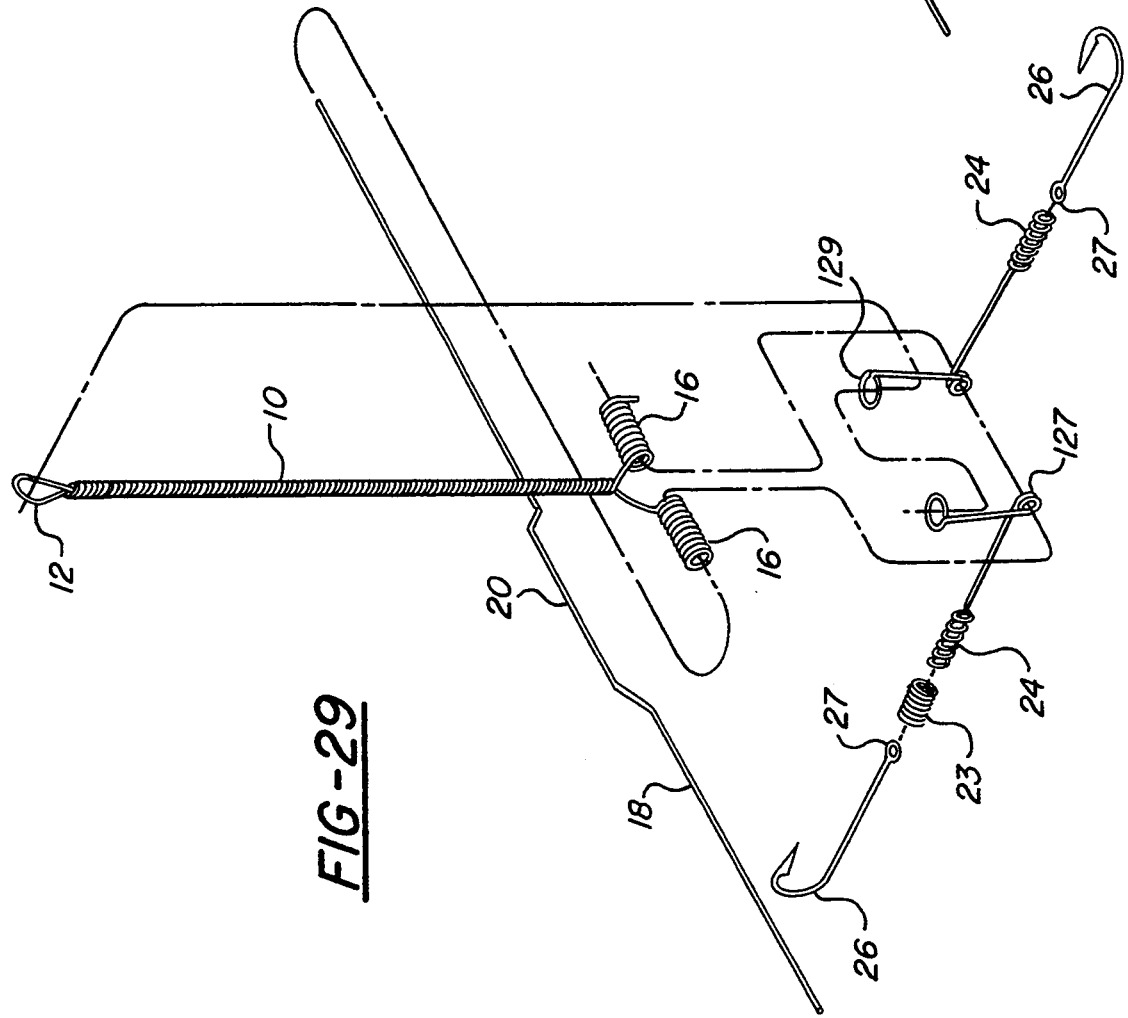

NO-SWALLOW DEVICE FOR FISH HOOKS AND THE LIKE

CONTINUING DATA

This is a continuation-in-part of application co-pending U.S. Ser. No. 07/864,403, filed Apr. 6, 1992, now U.S. Pat. No. 5,301,453.

FIELD OF THE INVENTION

A device for supporting fish hooks or similar fishing apparatus from a fishing line in a manner such that it is impossible for the fish to swallow the hook more than mouth deep.

BACKGROUND OF THE INVENTION

I am an avid fisherman and, like many other fishermen today, enjoy fishing for the thrill of the catch more than as a utilitarian means of providing food. Many fishermen accordingly prefer to throw the fish back for environmental reasons.

A fish hooked by the mouth is ordinarily not mortally wounded, and quickly recovers once thrown back in the water. Many times, however, the fisherman is obliged to kill the fish he intended to throw back because the hook has been swallowed more than mouth deep. Simply snipping the line is not satisfactory, first because the hook embedded internally in the fish will usually kill it, and second because an expensive hook and lure is lost.

The solution is to prevent the fish from being able to swallow the hook more than mouth deep. The prior art has not adequately recognized or solved this problem, and accordingly does not teach any structure which is simultaneously effective, inexpensive and easy to manufacture and use. U.S. Pat. No. 4,987,696 to Cook discloses a fish hook having one or more wing members fastened crosswise to the hook shank, the wing or wings disposed at an angle between 30° and 60° from the shank. The purpose of the wing is to create a hooking moment when the line is pulled to rotate the barb of the hook up and into the mouth of the fish. The wing is also briefly described as decreasing the probability of the hook being swallowed by a fish; however, the wing is inadequate with respect to size, placement and ease of construction to provide a satisfactory solution to the hook swallowing problem.

U.S. Pat. No. 5,022,177 to Gibson discloses a one-piece wire harness for converting regular fishing lures into spinner bait lures. An upper portion of the wire harness is bent at approximately right angles to the vertical shank of the harness to support a spinner.

U.S. Pat. No. 4,473,966 to Neal discloses a combination bobber and fish hook remover in which a short cross bar is fastened on a vertical hollow rod to provide a support about which the fish line is tied.

There are also many prior art devices known as "weedless" hooks or lures, usually providing a bar or ground member attached to the shank of the fish hook and extending downwardly at an angle to cover the point of the hook. These weed guards do not function adequately to prevent the swallowing of the hook by a fish more than mouth deep, largely due to their position on the hook itself, the angle at which they are set, and their direction of yield or give.

Prior art fish hook/lure harnesses also lack modularity, in that they are incapable of suitably handling a wide range of hook sizes, often limit the fisherman to only one hook or lure at a time, do not permit reconfiguration of the hook or lure, and are not easily disassembled and reassembled.

SUMMARY OF THE INVENTION

My invention is the first to truly recognize and provide an effective, realistic solution to the hook swallowing problem encountered in sport fishing, and to simultaneously supply the modularity and flexibility needed by today's fisherman. The invention provides effective, economical, easy to use support structure for suspending a fish hook or similar fishing apparatus from a fishing line to absolutely eliminate any risk that a particular fish might swallow the hook more than mouth deep. The invention is virtually foolproof, can be used with many off-the-shelf fish hook or related equipment, can be quickly and easily broken down for efficient storage when not in use, and will not interfere with the fish hook or with any aspect of normal sport fishing.

It is to be understood that while I refer to my invention as being used to support a "fish hook", it is to be understood that "fish hook" can include any known structure suspended from the end of a fishing line for the purpose of attracting and catching fish.

The invention in its broadest form generally comprises a fish hook support structure in the form of an upside-down T or cross having a vertical support shank whose upper end is attached directly to a fishing line, a long lateral swallow guard connected to and extending crosswise from the vertical shank, and a fish hook connection at or below the lateral guard from which the hook depends so as to freely swivel or rotate, much the same as if connected to ordinary fishing line. The lateral guard is connected to the vertical shank at or near the point from which the fish hook depends to prevent the fish from swallowing the hook more than mouth deep; i.e., to prevent the hook from being swallowed farther than its own length. The lateral guard is stiff enough that a fish cannot force it upwardly with respect to the support structure, and is wider than the fish's mouth. The length of the lateral swallow guard and its spacing from the hook can be varied depending on the type of fish being sought. When fishing for larger fish, the length and spacing of the lateral swallow guard will be greater; when fishing for smaller fish, the length and spacing of the swallow guard can be made smaller.

In a preferred form the entire invention is made from small gauge metal wire, although those skilled in the art will recognize that other materials can be used. In several versions the invention can be manufactured using inexpensive wire components commonly found in fishing supply stores, as will be described below.

The lateral swallow guard can be integral with the overall device, or can be removable so that the device can be broken down for easy storage when not in use.

In one embodiment the vertical support shank of the device branches at its lower end to form two lateral support points for the swallow guard. In an embodiment in which the swallow guard is removable, these lateral supports are in the form of one or more short tubular supports extending laterally of the vertical shank. The swallow guard is in the form of a relatively stiff wire member which can be axially inserted through the tubular supports and axially locked thereto.

In another embodiment, the tubular supports are elongated and themselves provide a swallow guard function. The wire member is still inserted to bridge the space between the tubular supports, and provides a connection or support point for a hook or hook-supporting structure. Because it is axially removable it facilitates the replacement or reconfiguration of any hook or hook supporting structure connected thereto.

In a further embodiment of the invention, the lateral guard is a wire member having a misaligned center portion which frictionally deforms and engages the tubular supports when inserted to lock the guard to the supports. In yet another embodiment, the lateral guard comprises two wire elements, each provided with its own locking structure for engaging one of the tubular supports. In each case the wire member or members extend between the spaced lateral supports when connected.

A further feature of the invention is a swing limit retainer positioned on the harness to limit the swing arc of the fish hook depending therefrom. In certain situations, for example when casting, a long hook might tend to swing up and become entangled with the lateral swallow guard. This can be prevented by limiting the upward swing arc of the hook relative to the harness.

The swing limit retainer can be made integral with the harness structure, or can be provided as a removable or aftermarket add-on. In one embodiment the swing limit retainer comprises a V-shaped element supported from the swallow guard or from the lateral supports, surrounding the point at which the fish hook swivels relative to the support structure. The retainer is both axially and rotationally locked with respect to the swallow guard and the vertical shank, and is provided with an aperture in the apex of the V through which the fish hook depends.

In still another embodiment of the invention, the one or more rigid hook-supporting members extend from the lateral swallow guard junction. The fish hook is attached to swivel at the end of this extension. The rigid extension distances the hook far enough from the swallow guard so that the hook cannot swing up and snag the guard. In a preferred form the rigid extension member or members are removable. Their rigid nature provides a built-in swing limit function.

These and other advantages of the present invention will be apparent from a further reading of the specification below.

BRIEF DESCRIPTION OF THE DRAWINGS

FIG. 1 is a perspective view of a first embodiment of the invention having a removable swallow guard;

FIG. 2 is an exploded perspective view of the invention of FIG. 1;

FIG. 3 is a perspective view of a second embodiment of the invention having a two-piece removable swallow guard;

FIG. 4 is an exploded perspective view of the invention of FIG. 3;

FIG. 5 is a perspective view of a third embodiment of the invention in which the swallow guard is integral with the overall support structure;

FIG. 6 is a view of the invention as shown in FIG. 2, further including one embodiment of a swing limit retainer;

FIG. 7 is a view of the invention in FIG. 6 wherein the swing limit retainer is shown in the disassembled condition;

FIG. 8 is a perspective view of an alternate embodiment of the two-piece swallow guard of FIGS. 3 and 4; and FIG. 9 is an exploded perspective view of the invention of FIG. 9;

FIGS. 10 and 11 are perspective views of a fourth embodiment of the harness of the present invention in disassembled and assembled condition;

FIGS. 12 and 13 are perspective views of an alternate embodiment of the invention of FIGS. 10 and 11, in the disassembled and assembled condition;

FIGS. 14 and 15 are side and perspective views of a fifth embodiment of harness invention;

FIG. 16 is close up side view of hook attachment structure shown on FIGS. 14 and 15;

FIGS. 20 and 21 are perspective views in the disassembled and assembled condition of a combination of the embodiments of FIGS. 12-15;

FIGS. 22 and 23 are perspective views in the disassembled and assembled condition of a sixth embodiment of the invention incorporating structure from FIGS. 10 and 11;

FIGS. 24 and 25 are perspective views in the disassembled and assembled condition of a combination of the embodiments of FIGS. 10-11, 12-13, 14-15, and 20-23;

FIGS. 26 and 27 are perspective views in the disassembled and assembled condition of a seventh embodiment of a harness according to the present invention;

FIGS. 29 and 30 are perspective views in the disassembled and assembled condition of an alternate embodiment of the invention shown in FIGS. 20 and 21, applicable generally to all embodiments showing coil support structure for a fish hook.

DETAILED DESCRIPTION OF THE DRAWINGS

Figure 18:
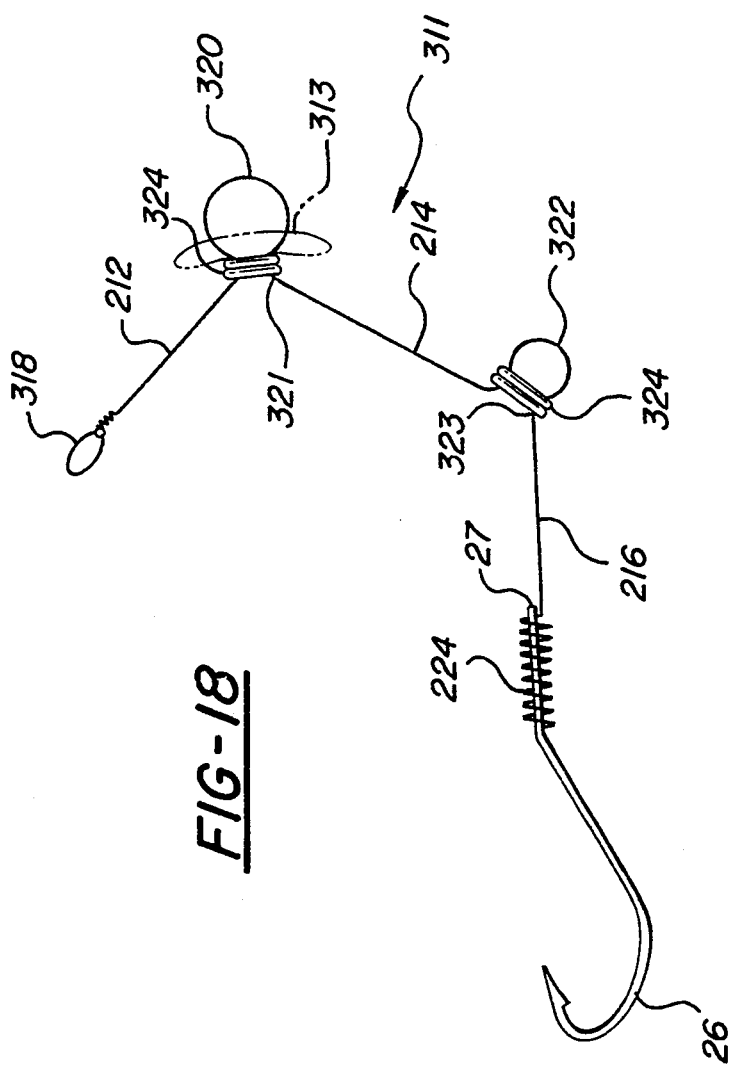
FIGS. 18 and 19 show an alternate embodiment of shock-absorbing harness structure shown on FIGS. 14 and 15.

The following description is in reference to the attached drawings. Like reference numerals are used throughout for the various embodiments where the structure is the same or similar.

Referring now to FIGS. 1 and 2, a first embodiment of the present invention is shown generally-as a fish hook support structure having the form of an upside down T from which a standard fish hook and swivel leader are supported. The invention comprises a vertical support shank 10 formed from twisted or braided metal wire, with an eye 12 at its upper end to which fishing line (not shown) is tied. Shank 10 branches at its lower end at 14 to form lateral tubular supports 16 in the form of wire spring coils. Coil supports 16 are coaxial and are slightly spaced at 17. This support structure is commonly known as a "spreader" and can be found at most fishing supply stores, its usual purpose being to fish with more than one hook/line combination at a time.

A one-piece lateral swallow guard 18 extends through coil support 16 cross-wise of shank 10. Swallow guard 18 is in the form of a straight wire with an offset or misaligned center portion 20 approximating the end-to-end length of coil supports 16. Misaligned center portion 20 is formed, for example, by crimping a straight piece of wire. Misaligned portion 20 is connected to the coaxial main portion of the wire by angled cam portions 22. A standard hook and swivel leader arrangement 24,26 is connected to the support by attaching eye 27 to the segment of misaligned portion 20 extending between coil supports 16 and space 17. It will be apparent to those skilled in the art that the hook and swivel leader structure 24,26 is free to swivel or pivot about its point of attachment to the support.

Referring specifically to FIG. 2, swallow guard 18 is inserted into and removed from coil supports 16 axially. When guard 18 is inserted through the lateral coil springs, the crimped or misaligned portion 20 deforms these springs enough to create a tight frictional lock between the springs and the wire. Misaligned portion 20 is offset from the axis of the free ends of guard wire 18 a distance at least equal to, and preferably slightly greater than, the inner diameter of the coil spring 16. As guard 18 is inserted, a leading one of angled cam portions 22 first interferingly engages and begins deforming the coil spring until that leading angled portion 22 is pushed all the way through the spring. Coil spring 16 resumes its normal shape when it engages misaligned portion 20. The same thing happens as guard wire 18 is further pushed through the remaining coil spring, until guard wire 18 literally pops into place as shown in FIG. 1.

Since misaligned portion 20 approximates the end-to-end length of the two coil springs 16, guard wire 18 is axially locked with respect to the coil springs 16 by angled portions 22. Guard wire 18 cannot be removed unless a sufficient axial force is applied to force the angled cam portions 22 through coil springs 16. The nature of this locking mechanism is such that insertion and removal are accomplished in a smooth, but discernible, two-step motion as the leading angled portion 22 of the misaligned crimp 20 is forced through each coil spring 16.

It will be clear from the above that the fish hook and swivel leader structure are connected to the support when one end of guard wire 18 is first positioned in space 17 between coil springs 16. The fish hook and swivel leader 24,26 are locked into place between the coil supports when guard wire 18 is assembled as shown in FIG. 1.

While the above-described embodiment of the invention is described as being made from small gauge metal wire, it will be apparent to those skilled in the art that other materials may be used. Also, the body of the support (the "spreader") comprising shank 10, eye 12, branches 14 and support 16 do not have to be formed from wire, but could be stamped from metal or molded from plastic, as desired. Lateral supports 16 do not have to be in the form of coil springs, but can comprise other types of spread supports. Where the lateral supports are referred to as tubular, it is to be understood that this can include tubes of rectangular or other cross-section, so long as they operate to adequately support and lock the guard wire. Also, while lateral supports 16 are disclosed in the illustrated embodiment as two spaced elements, a single continuous support is possible as long as the fish hook can be attached in the vicinity of the junction between the vertical shank and the lateral support.

It is important to maintain the spacing 17 between coil supports 16 at a minimum to prevent excessive flexibility in branches 14 and supports 16 when force is applied along the axis of the shank, for example when a fish is being hauled in. By keeping this spacing at a minimum, the moment tending to deform guard wire 18 and coils 16 is kept at a minimum as well.

The use of small gauge metal wire is advantageous because it is desirable to keep the support and guard structure as slender and unobtrusive as possible to avoid spooking fish. The guard wire and support structure can also be painted to reduce reflection and help it blend in with the aquatic environment in which it is being used.

Referring now to FIGS. 3 and 4, a second embodiment of the invention is shown in which the lateral swallow guard comprises two half portions 28, each of which is inserted through coil springs 16 from opposite sides as shown in FIG. 4. Each portion 28 of the guard wire includes a straight main portion 30, a spring loop 32 best described as shown as being keyhole-shaped, and a clasp hook 34 at the free end of spring loop 32 which is normally biased to an open position away from main portion 30, but which can be snapped into locking engagement with main portion 30 somewhat in the manner of a safety pin.

Main portion 30 of each half 28 of the guard wire is inserted through both coil springs 16 until the coil spring through which it was first inserted is substantially enclosed within spring loop 32. At this point clasp hook 34 has cleared the coil spring and is free to be hooked to main portion 30 at space 17 between the coils. As in the embodiment of FIGS. 1 and 2, swivel leader and hook structure 24,26 is connected to the support by positioning eye 27 in space 17 and inserting the ends of wires 28 therethrough as they are pushed through the coil springs.

The two-piece embodiment of FIGS. 3 and 4 provides a stronger locking engagement between guard wire portions 28 and the coil springs than the frictional locking engagement between one-piece guard wire 18 and the coil springs in the embodiment of FIGS. 1 and 2. Guard wire portions 28 in the embodiment of FIGS. 3 and 4 can only be removed by unhooking clasp hooks 34, which is almost impossible to do by accident. No amount of axial force can remove either of portions 28 until the clasp hooks 34 are released.

The two-piece embodiment of FIGS. 3 and 4 also provides increased stiffness and strength at the point of connection between the swallow guard and hook and leader structure. Eye 27 is supported by two thicknesses of wire rather than one, making the swallow guard less likely to bend or break with the weight of a fish on the hook.

Referring now to FIG. 5, a third embodiment of the present invention is shown comprising a one-piece support structure 10,12,14 with integral swallow guards 38 and hook support 40. In the embodiment shown, the device is formed from a single piece of twisted or braided wire. As in the above embodiments, use of the particular materials shown is not necessary, as will be apparent to those skilled in the art. For example, the support could be stamped or molded from a single piece of metal or plastic.

Referring now to FIGS. 6 and 7, a fourth embodiment of the invention is shown in which a swing limit retainer 42 has been added to the invention of FIGS. 1 and 2. It will be apparent to those skilled in the art that swing limit retainer 42 can be used equally with any of the embodiments of the invention disclosed.

While it is advantageous to pivotally attach leader and hook structure 24,26 as close to swallow guard 18 as possible, in order to limit the distance the fish can take the hook into its mouth, it creates a disadvantage in that the freely swinging hook might swing up and become tangled with guard wire 18, for example when casting. To prevent this from happening it is necessary to limit the swing arc of hook 26 below the level of guard wire 18.

In the illustrated embodiment of FIGS. 6 and 7, swing limit retainer 42 comprises a V-shaped hollow element supported from coil springs 16 and surrounding the swivel point of hook 26 located at the spacing 17 between the coil springs. The swing limit retainer preferably comprises a sheet of thin, deformable material such as sheet metal which retains its shape once deformed. It is initially formed as best shown in FIG. 7 as a rectangular sheet of metal provided with three apertures 46,48 and opposed locking tabs 50. The sheet is folded in half across aperture 48 up and over coil springs 16 such that each extends through one of side apertures 46 in side walls 44 of the formed V.

Made from a deformable sheet metal, retainer 42 will retain its V-shape once bent into position. Since the material does not easily spring back to its flat position, the V-shaped retainer 42 will tend to remain axially locked with respect to coil supports 16; i.e., it will not readily slide off to either side. To rotationally lock retainer 42 about the coil springs, locking tabs 50 are next bent inwardly on each side of shank 10. In the embodiments shown, locking tabs 50 are of sufficient length to bridge the spacing between side walls 44 in the assembled condition and no longer. If desired, however, locking tabs 50 can be made slightly longer such that the excess portion extending over the opposite side wall 44 can further be bent downwardly parallel to that side wall to strengthen the axial lock of retainer 42 relative to the spring coils.

In the assembled condition of FIG. 6, aperture 48 in the apex of the V of retainer 42 is aligned with shank 10 so that leader and hook structure 24,26 can be inserted therethrough to be connected to guard wire 18 in the manner described above. The size of aperture 48 determines the limit of the swing arc of the hook and leader 24,26 relative to the swallow guard, as does the length and pitch of side walls 44. Depending on the length of the leader and hook structure 24,26 being used, retainer 42 is sized such that the hook is incapable of swinging up and snagging guard wire 18.

While swing limit retainer 42 is described as comprising a deformable sheet metal, it should be understood by those skilled in the art that other materials can be used. For example, swing limit retainer could be made from a deformable plastic. In fact, the retainer does not have to be made from a material which holds its shape are deformed if locking tabs 50 are made to hold it together axially as described above.

Referring again to FIG. 5, the integral support structure 10,12,14,38,40 can be given a swing limit function by providing a rigid extension (not shown) of shank 10 at 40, extending downwardly to provide a hook support below the level of guard 38. By rigidly spacing the hook support sufficiently below guard 38, the swing limit of hook 26 is maintained below guard 38 to prevent entanglement. Of course, a swing limit retainer as disclosed above can be used with the embodiment of FIG. 5.

Referring to FIGS. 8 and 9, an alternate version of the two-piece swallow guard 28 in the embodiment of FIGS. 3 and 4 is shown comprising two half portions 128. Swallow guard portions 128 each comprise an offset or misaligned end portion 120 approximating the end-to-end length of coil supports 16. Each portion 128 also includes an angled cam portion 122 and an upraised hook 134.

Spring loops 32 of guard 28 in FIGS. 3 and 4 tend to interfere with swing limit retainer 42, and are difficult to close with retainer 42 in place. The embodiment of FIGS. 8 and 9, however, is particularly suitable for use with a swing limit retainer 42 such as that shown in FIGS. 6 and 7. Each portion 128 is inserted straight end first through spring coils 16 and, once inserted, remains axially locked in both directions without the need to manipulate any locking structure. Angled portion 122 axially locks swallow guard 128 in the withdrawal direction; i.e., swallow guard portion 128 cannot be withdrawn from spring coil 16 once inserted unless enough force is applied to force angled portion 122 through spring coils 16. Hook portion 134 limits the axial motion of swallow guard portion 128 through coils 16 in the insertion direction by hooking on the outside edge of the coil 16 through which it is first inserted. Since there is no spring hoop structure surrounding either spring coil 16, swallow guard portions 128 can be inserted and assembled without interfering with a swing limit retainer already in place.

As noted above in the embodiment of FIGS. 3 and 4, use of a two-piece swallow guard greatly strengthens the assembled swallow guard at its point of connection with swivel leader and hook structure 24,26, since eye 27 is supported by two thicknesses of wire.

Referring now to FIGS. 10-13, another embodiment of the invention is disclosed incorporating the structure of the FIG. 1 embodiment, where the fish hook 26 is connected to the portion of wire guard 18 extending between lateral supports 16. As explained above, with reference to FIGS. 6 and 7, it is desirable to both space hook 26 close enough to the swallow guard structure 18 to prevent its being swallowed too deep by a fish, while at the same time limiting the swing arc of hook 26 about its pivot point to prevent its becoming tangled with guard 18. If hook 26 is directly attached by its eye to portion 20 of guard 18, or attached by means of a flexible coupling such as swivel leader 24, it is necessary to employ some sort of additional swing limit retainer structure such as the V-shaped retainer 42 in FIGS. 6 and 7 to limit the swing arc of the hook 26. This of course increases the cost and complexity of the overall structure. This problem would be solved by using a rigid extension from the harness to the fish hook. Permanently affixing a rigid extension member to the harness would negate many of the advantages inherent in the invention; e.g., the ability to break the harness down for storage, and the corresponding ability to quickly and easily adjust the length of the extension member to alter the spacing of the fish hook from the guard 18.

This problem is solved by using a removable, rigid extension member 124 as shown in FIGS. 10 and 11 Rigid extension member 124 spaces fish hook 26 a sufficient distance from guard 18 to prevent its entanglement therewith, is easily removed and replaced with rigid extension members of varying lengths and orientation, has a built-in swing limit function, is modular in that more than one can be used at a time on the same harness, and is inexpensive and simple to manufacture and use.

Extension member 124 has a first hook- or lure-supporting end, in the illustrated embodiment a spring loop 132 similar to spring loop 32 shown in FIGS. 3 and 4. Spring loop 132 has a clasp hook 134 at its free end which can be selectively engaged with leg 130 of extension member 124 to close the loop and lock fish hook 26 thereto. The other end of extension member 124 is designed for removable connection to intermediate portion 20 of guard wire 18 between the lateral supports 16.

Extension member 124 is connected to harness 11 as follows. Upper horizontal loop 129 first slides over eye 12 of vertical support shank 10 until vertical loop 127 is aligned with the axis of tubular lateral supports 16. Guard wire member 18 is next inserted through tubular supports 16 thereby passing through loop 127, and is locked to supports 16 as described above. Once assembled as shown in FIG. 11, loop 127 connected to portion 20 of guard wire 18 between lateral supports 16 vertically locks extension member 124 in position in all directions. Extension member 124 cannot move up or down relative to the axis of support shank 10 due to interference with portion 20 of guard wire 18. Interference between shank 10 and upper loop 129 prohibits rotation of extension member 124 about the axis of guard wire 18. Lateral supports 16 and the diameters of loops 129 and 127 also limit the side-to-side play of extension member 124.

Accordingly, extension member 124 provides the means for attaching fish hook 26 to device ill without the need for separate swing limit structure. At the same time, it is easily removed and replaced.

Referring now to FIGS. 12 and 13, an alternate version of extension member 124 is shown as a pair of L-shaped extension members 136. Extension members 136 are identical to straight extension member 124 except for an approximately 90° bend at loop 127 dividing it into vertical leg 128 and horizontal leg 130. This L-shaped configuration is useful for positioning the hook to take advantage of horizontally-striking fish, either by hanging a standard fish hook 26 from horizontally extending spring loop 132, or using alternative hook structure 26' whose connecting eye 27' is perpendicular to the hook shank. As shown in FIG. 12, two L-shaped extension members 136 can be used at the same time on a single harness 11 to increase the number of hooks used on a single fishing line. This modularity can be extended to include a third straight extension member 124 as shown in FIGS. 10 and 11 so that three hooks can be used at a time.

L-shaped extension members 136 can also be attached directly to a fishing line as if the fishing line were vertical support 10. In this case it is desirable to tension the fishing line with a weight or sinker to provide stiffness in the line between loops 127 and 129. The line acts both as vertical support 10 and connector bar 18 to prevent swing. Although the above variation is possible, the use of L-shaped extension 136 with harness 11 and connector bar or guard wire 18 is preferable, since it provides for a more rigid, easier-to-assemble and modular structure.

It will be apparent to those skilled in the art that while the angles of the various components of extension members 124 and 136 in FIGS. 10-13 are illustrated as essentially right angles, variations in angular position may be made and still lie within the scope of the present invention.

Referring now to FIGS. 14-17, a further embodiment of an anti-swallow harness for supporting a fish hook or lure rigidly at a preferred biting angle is generally shown at 211. In the illustrated embodiment device 211 has an upper angled leg 212, a lower angled leg 214, and a horizontal extension 216. Upper leg 212 terminates at its upper end in loop 218. Upper angled leg 212 and lower angled leg 214 are joined by intermediate loop 220. Lower angled leg 214 and horizontal extension leg 216 are joined by lower loop 222. Harness 211 is preferably formed out of a single piece of flexible wire as shown, simply wound into coils at the bands to define upper, intermediate and lower loops 218, 220, and 222 and angled at each loop joint to achieve the desired angular configuration.

Harness 211 is connected to a fish line or structures supported to a fish line at upper loop 218. The free end of horizontal extension leg 216 rigidly supports a fish hook 26 in a horizontal position. Accordingly, when the device is suspended from a fishing line, its balance and angular orientation are such that fish hook 26 remains in essentially horizontal position, advantageously placed for horizontal fish strikes. It will be understood by those skilled in the art that other angular positionings of the hook can be accomplished simply by altering the angular configuration of legs 212, 214, and 216. The gist of the invention lies in the structure of the loop joints and the hook attachment mechanism described below.

To securely attach fish hook 26 to horizontal leg 216, the free end of horizontal extension leg 216 is formed into a coil 224 whose axis is essentially parallel to the axis of extension 216. Coil 224 is best shown in FIG. 16 comprising a number of equally-spaced coils 225 extending to the free end 217 of horizontal extension leg 216, and a trailing coil 226 merging into horizontal extension leg 216. Trailing coil 226 is at a much shallower angle than coils 225 for a purpose hereinafter explained.

To attach fish hook 26 to horizontal extension leg 216 in a rigid, locking fashion, fish hook eye 27 first slid over free end 217 and wound progressively further down the length of the coil toward lower loop 222. The shank of the fish hook must be maintained within the coils as eye 27 is wound progressively further along their length. Each twist increases the length of coil 224 surrounding and acting as a tubular support for the shank of the hook. Upon reaching last coil 226, the shallower angle of coil 226 misaligns the hook eye from the axis of coils 225, requiring that extra force be applied to force eye 27 past coil 226. This slightly deforms coil 224 and gives an axial dimension to the last twist which locks the hook 26 in place. In this manner, the locking connection between coil 224 and hook 26 has both a rotational and an axial component.

Once assembled in this fashion, hook 26 is rigidly supported along the axis of coil 224 aligned with horizontal extension leg 216, and cannot be removed without a substantial initial twisting force to overcome the lock provided by coil 226, and a complete unwinding of hook 26 from coils 225. This is virtually impossible for a hooked fish to accomplish.

The use of coil 224 as the rigid support and locking structure for fish hook 26 allows the entirety of device 211 to be formed from a single piece of wire. This of course greatly simplifies manufacture and reduces cost.

A single coil 224 is capable of accepting and rigidly supporting a wide range of hook sizes, so long as eye 27 can be wound about the coils. This also reduces end cost for the fisherman, who only needs to buy two or possibly three of the devices 211 to accommodate a very wide range of hook sizes.

Another important feature of device 211 is the nature of loop joints 218, 220, and 222 in the form of double coil springs. These provide a shock-absorbing function when the hook is taken by a fish, giving the overall structure of harness 211 a mechanism which progressively resists straightening when the force of the hooked fish tends to pull the various legs out of their preset angular configuration.

Figure 17:
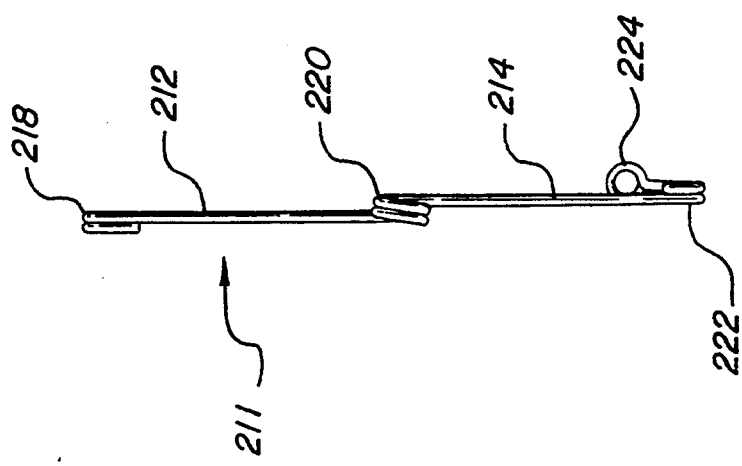
FIG. 17 is a front view of the invention of FIGS. 14 and 15.

To accomplish this, each of loops 218, 220 and 222 must be wound in the same direction as best shown in FIG. 17, such that the spring coils at each joint are compressed as hook 26 and upper loop 218 are pulled apart. This is a great benefit in reducing broken lines due to the initial shock when the fish first takes the hook.

The angular orientation of the various legs also provides an anti-swallow function to prevent the fish from swallowing the entire harness 211. Specifically, the rigid spacing of hook 26 from legs 212 and 214 will typically prevent a fish from being able to swallow much farther than lower loop 222.

Figure 19:

The embodiment of FIGS. 14–17 lends itself more advantageously to a fairly stiff wire. Very thin or very flexible wire in the body of harness 211 may not provide enough resistance in the spring coil loops to resist straightening out. To overcome this tendency when smaller gauge or more flexible wire is used, another embodiment of the invention is shown in FIGS. 18-19. In this embodiment, upper loop 218 has been replaced by a standard eye 318 for attachment to a fish line. Coil spring loop joints 220 and 222 have been replaced by joints 320 and 322 in the form of bulb-shaped loops in the wire of harness 311. Each bulb-shaped joint has necked-down portion 321,323. Horizontal extension leg 216 has the same locking coil 224 formed on its free end for rigidly and horizontally supporting fish hook 26.

To resiliently reinforce intermediate loop joint 320 and lower joint loop 322, split rings 324 are tensioned around necked-down portions 321, 323 as shown. This arrangement greatly increases the force required to straighten harness 311 out, and ensures that it will always return to its original shape when tension is removed. In an improved form shown in broken lines in FIG. 18 at 313, the bulb-shaped loop is flattened to increase the angle between the loops 320,322 and necked-down portions 321,323.

I have further found that hook 26 can be securely locked to coil 224 without the need for the last, shallow locking coil 226 as shown in FIG. 16. This is achieved by offsetting the upper end 26a of the hook shank near eye 27 from the lower portion of the shank near the hook. Once the first upper portion 26a of the shank is fully inserted into spring coil 224, further introduction of the lower offset portion into coil 224 tends to deform coil 224 and requires additional force to further screw hook 25 into the coil. This allows a single spring coil of unlimited length to accommodate any hook incorporating the offset shank portions, giving the fisherman great flexibility with a given harness and coil 224.

The frictional lock between hook 26 and coil 224 can also be increased by setting the space between coils 225 less than the diameter of the fish hook wire at eye 27. This increases the force required to unwind hook 26 from coil 224, and is sufficient alone or can be used to supplement the connections between hook and coil described above.

Referring now to the remaining figures, it can be seen that the various inventive features of my wire harness structure set forth above in FIGS. 14–19 can be incorporated into the harness structure of FIGS. 1-13 in a variety of ways to achieve unprecedented flexibility and modularity.

FIGS. 20–21 show a modification of the L-shaped rigid extension member 136 of FIGS. 12–13. The double spring coil loop of FIGS. 14-16 can advantageously be employed in either or both of loops 127, 129 to provide increased shock-absorption in the overall harness structure.

FIGS. 20 and 21 also show the coil support 224 of FIGS. 14–16 replacing the spring loop 132 of rigid extension members 136 of FIGS. 12–13.

FIGS. 22 and 23 show an embodiment in which the coil support mechanism 224 of FIGS. 14–16 has been incorporated into lateral supports 16 of harness 11. Supports 16 in this embodiment are elongated so that they provide a guard wire function, and at the same time rigidly support a fish hook 26 in the horizontal position. In this version, guard wire 18 is replaced with a short connector bar 118 to provide a support for loop 127 of extension member 124 between supports 16. Connector bar 118 is held in place within tubular supports 16 by the fish hooks 26 wound into the coils from either end, and can be removed axially when either hook is unwound.

FIGS. 24 and 25 show the modifications of FIGS. 20–23 combined in a single harness to permit the support of four hooks 26 and a sinker. It should be noted that every hook is protected by a swallow guard comprising a combination of vertical support shank 10, lateral supports 16, and/or rigid extension members 136.

Figure 28:
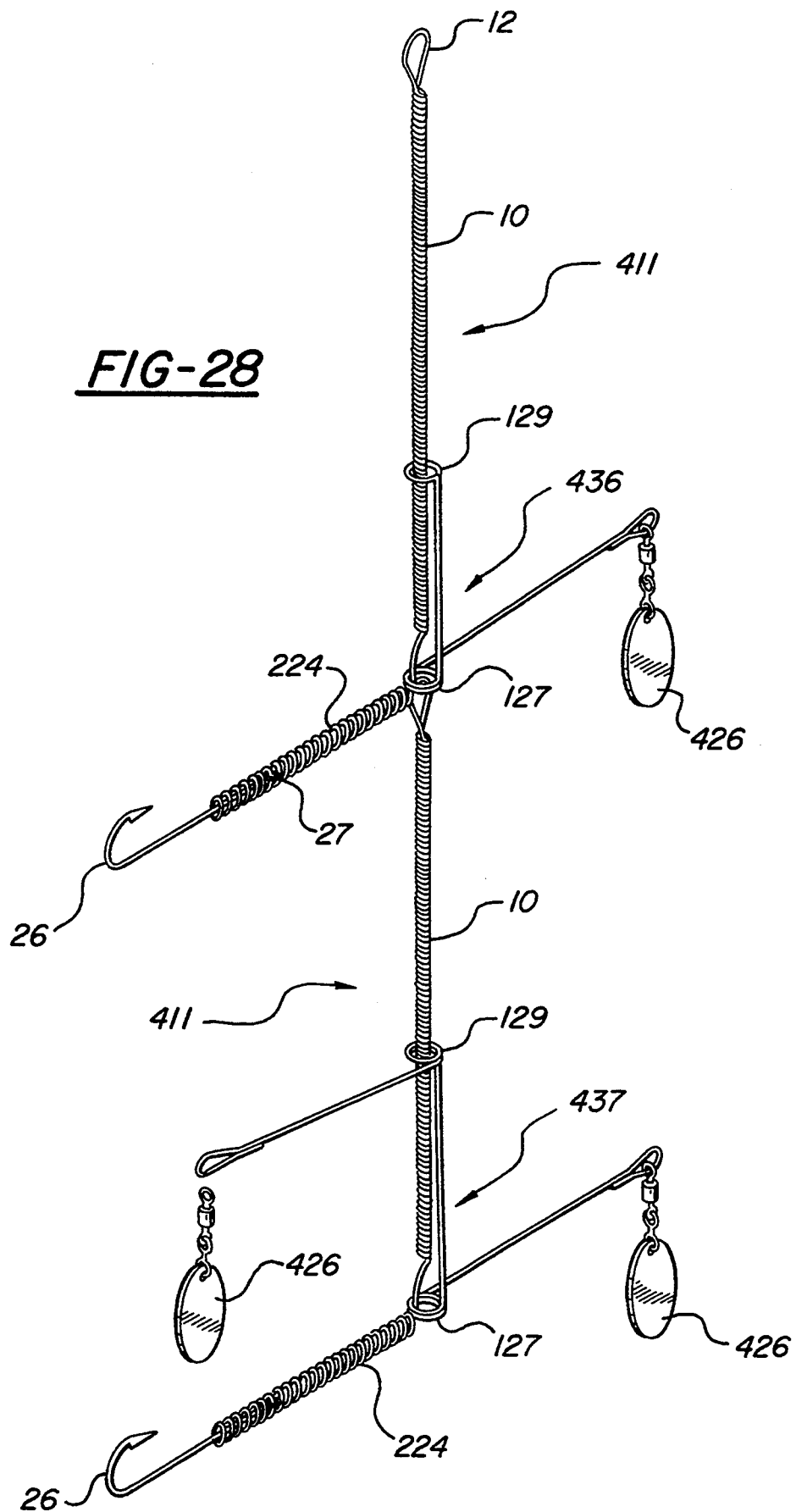
FIG. 28 is a perspective view of two of the harness inventions of FIGS. 26 and 27 combined in modular fashion.

FIG. 26–28 show yet another variation of the invention wherein L-shaped extension members 136 have been slightly modified to be employed along the vertical support shank 10 of an L-shaped harness to provide a detachable spoon or lure support in conjunction with the various hooks 26 fastened to the harness. The modification simply involves changing the plane of loop 127 from the vertical, as shown in FIGS. 10–13, to the horizontal to match loop 129. This aligns the axes of the two loops so that both can axially slide over and along shank 10. Eye 12 is preferably slightly larger than the diameter of loops 127, 129, but its flexibility permits the loops to be "popped" on and off in an axial direction.

It will of course be understood that spoon supports 436 can be used on either L-shaped harness 411 or T-shaped harnesses as shown above, in accordance with the modular of the invention. Moreover, the extension members and hook attachment support structures shown in use with the T-shaped harness 11 above can be used with the L-shaped harness 411 of FIGS. 26–28, with little or no modification.

Spoon support 436 is vertically reversible on shank 10 so that it can be used on shank 10 either in a normal upright L-shape as illustrated, or upside down. In this manner, the position of the spoon 426 can be adjusted according to the type of fish sought and the desired location of the hook relative to the spoon. Moreover, spoon support 436 is capable of rotation about shank 10. Gravity will normally hold spoon support 436 in position at the lower end of shank 10.

While spoon support 436 is shown as an L-shaped device similar to as extension members 136 shown in FIGS. 10–13, it may also be formed as a Z-shaped support 437 to support two spoons at a time, if desired.

FIG. 28 shows two of the L-shaped harnesses 411 connected in modular fashion. Eye 12 of the lower harness 411 slides over eye 12 and vertical support 10 of upper harness 411. Both L-shaped and Z-shaped spoon supports 436,437 are employed in this version. It will of course be understood that more than one spoon support can be used on a single harness 411 or 11.

Referring now to FIGS. 29 and 30, a further embodiment of locking structure for use with coil supports 24 (or 224) is shown as an axially removable overspring 23 which fits over coil 24. Overspring 23 is first placed over coil support 24, preferably in snug engagement therewith although the closeness of fit can vary with the thickness of the hook eye 27. As hook 27 is wound onto coil support 24 in the manner described above, eye 27 frictionally engages overspring 23 to axially and radially deform it. The force required to so deform overspring 23 must be overcome to unwind hook 26 from coil support 24.

The foregoing description of the illustrated embodiments is not intended to be limiting, as it will be understood by those skilled in the art that many variations and modifications of the invention will lie within the scope of the appended claims.

I claim:

1. A harness for removably supporting one or more fishing lures or hooks in modular fashion and in such a way so as to prevent fish from swallowing the hook or lure too far, comprising:
   a vertical support for connection to a fishing line at a first upper end thereof;
   two spaced coaxial supports extending laterally from a lower end of the vertical support; and
   connector bar means removably connected between the coaxial supports, the connector bar means axially connected to and removable from the coaxial supports.

2. Apparatus as defined in claim 1, wherein the coaxial lateral supports comprise two spaced tubular elements connected to and extending from the lower end of the vertical support, the connector bar means axially slidable through said tubular elements to bridge the space therebetween.

3. Apparatus as defined in claim 1, further including a rigid extension member having hook attachment means at one end for removably connecting a fish hook or lure, and harness attachment means at a second end for removably connecting the extension member to the connector bar means between the lateral supports.

4. Apparatus as defined in claim 3, wherein the harness attachment means on the fish hook/lure extension member include swing limit means for locking the extension member vertically, laterally and radially when connected to the connector bar means.

5. Apparatus as defined in claim 4, wherein the swing limit means include a first portion removably connected to the vertical support, and a second portion removably connected to the connector bar means between the lateral supports.

6. Apparatus as defined in claim 5, wherein the first portion comprises a loop in a first plane for axial sliding engagement with the vertical support, and the second portion comprises a second loop in a plane at right angles to the first loop for axial sliding engagement with the connector bar means.

7. Apparatus as defined in claim 6, wherein the extension member is L-shaped, with a first leg ending in the fish hook/lure attachment and extending at right angles to the vertical support, and a second leg including the harness attachment means parallel to the vertical support.

8. Apparatus as defined in claim 6, wherein the extension member is straight and is aligned with the vertical support when connected to the harness.

9. Apparatus as defined in claim 1, wherein the connector bar means further comprise lateral guard means extending beyond the lateral supports.

10. Apparatus as defined in claim 3, wherein the hook attachment means comprise support means for rigidly supporting the hook along a set axis.

11. Apparatus as defined in claim 10, wherein the support means engage a substantial portion of the shank of the fish hook.

12. Apparatus as defined in claim 11, wherein the support means comprise a tubular support surrounding a substantial portion of the shank of the fish hook, further including means for axially locking the hook shank to the support.

13. Apparatus as defined in claim 12, wherein the support means comprise a coil support comprising a plurality of coaxial wire coils having a free end, a locking end, and an axial bore, the fish hook wound eye first along the coils from the free end to the locking end such that a substantial portion of the hook shank is within the axial bore.

14. Apparatus as defined in claim 7, wherein the first and second legs are connected by a resilient joint tending to resist an increase in the angle of separation of the legs.

15. Apparatus as defined in claim 14, wherein the extension member comprises a single piece of wire wound at the resilient joint to define at least two spring coils which are compressed as the angle of separation between the first and second legs increases.

16. Apparatus as defined in claim 14, wherein the extension member comprises a single piece of wire and is formed at the resilient joint into an open-ended loop.

17. Apparatus as defined in claim 16, wherein the open-ended loop has a narrowed neck portion and further includes tensioning means exerting a closing force on the neck of the loop tending to close the loop.

18. A harness for removably supporting one or more fishing lures or hooks in modular fashion and in such a way so as to prevent fish from swallowing the hook or lure too far, comprising:
   a vertical support for connection to a fishing line at a first upper end thereof;
   rigid extension means for removably connecting a fish hook or lure to the vertical support in a fixed, substantially rigid position spaced a set distance from the vertical support, the extension means comprising a tubular element connected to and extending laterally from the vertical support, the tubular element comprising a coil element for rotatably and axially engaging the eye and shank of the fish hook.

19. Apparatus as defined in claim 18, wherein the coil support includes axial lock means to lock the hook shank axially with respect to the coil support.

20. Apparatus as defined in claim 19, wherein the axial lock means comprise an offset coil portion at a distal end coil support.

21. Apparatus as defined in claim 19, wherein the axial lock means comprise individual coils in the coil support axially spaced a distance less than the thickness of the wire in the eye of the fish hook such that they are axially displaced by the eye as the fish hook is wound onto the coil support.

22. Apparatus as defined in claim 19, wherein the axial lock means comprise an overspring having a diameter larger than the diameter of the coil support, mounted over the coil support to both axially and radially engage the fish hook when it is wound onto the coil support.

23. Apparatus as defined in claim 22, wherein the overspring is axially removable from the coil support.

24. A harness for removably supporting one or more fishing lures or hooks in modular fashion and in such a way so as to prevent fish from swallowing the hook or lure too far, comprising:
   a vertical support for connection to a fishing line at a first upper end thereof;
   at least one lateral tubular support connected to and extending laterally from a lower end of the vertical support;
   fish hook attachment means associated with the lateral tubular support for removably connecting a fish hook to the vertical support and rigidly spacing the fish hook from the vertical support at substantially right angles to the vertical support.

25. Apparatus as defined in claim 24, wherein the lateral tubular support comprises a coil support having a plurality of spaced coaxial wire coils having a free end spaced from the vertical support and defining an axial bore, the fish hook wound eye first along the coils from the free end toward the vertical support such that a substantial portion of the hook shank is within the axial bore.

26. Apparatus as defined in claim 24, wherein the harness comprises two spaced, coaxial lateral tubular supports, further including connector bar means removably connected between the lateral tubular supports, the connector bar means axially slidable through said tubular lateral supports to bridge the space therebetween.

27. Apparatus as defined in claim 24, further including at least one rigid extension member removably connected to the vertical support to space a fish hook or lure a fixed distance from the vertical support in a desired relationship relative to the lateral tubular support.

28. Apparatus as defined in claim 27, wherein the lateral tubular support removably supports a fish hook at a free end thereof, and the rigid extension member supports a lure a fixed distance from the vertical support approximately equal to the distance of the fish hook from the vertical support.

29. Apparatus as defined in claim 28, wherein the rigid extension member comprises an L-shaped device having a first connector leg for removable connection to the vertical support parallel thereto, and a second extension leg at right angles to the first connector leg, the first connector leg including means for slidably axially connecting to the vertical support, and the second extension leg including means at a free end thereof for supporting a fish hook or lure.

30. A harness for removably supporting one or more fishing lures or hooks in modular fashion and in such a way so as to prevent fish from swallowing the hook or lure too far, comprising:
   a vertical support for connection to a fishing line at a first upper end thereof;
   rigid extension means for removably connecting a fish hook or lure to the vertical support in a fixed, substantially rigid position spaced a set distance from the vertical support, the extension member removably connected to the vertical support, the extension member including hook attachment means at one end for removably connecting a fish hook or lure, and harness attachment means at a second end for removably connecting the extension member to the harness, the harness attachment means including swing limit means for locking the extension member vertically, laterally and radially when connected to the harness.

* * * * *